A. TANGEN.
MICROMETER.
APPLICATION FILED SEPT. 8, 1920.
1,385,405.
Patented July 26, 1921.
3 SHEETS—SHEET 1.
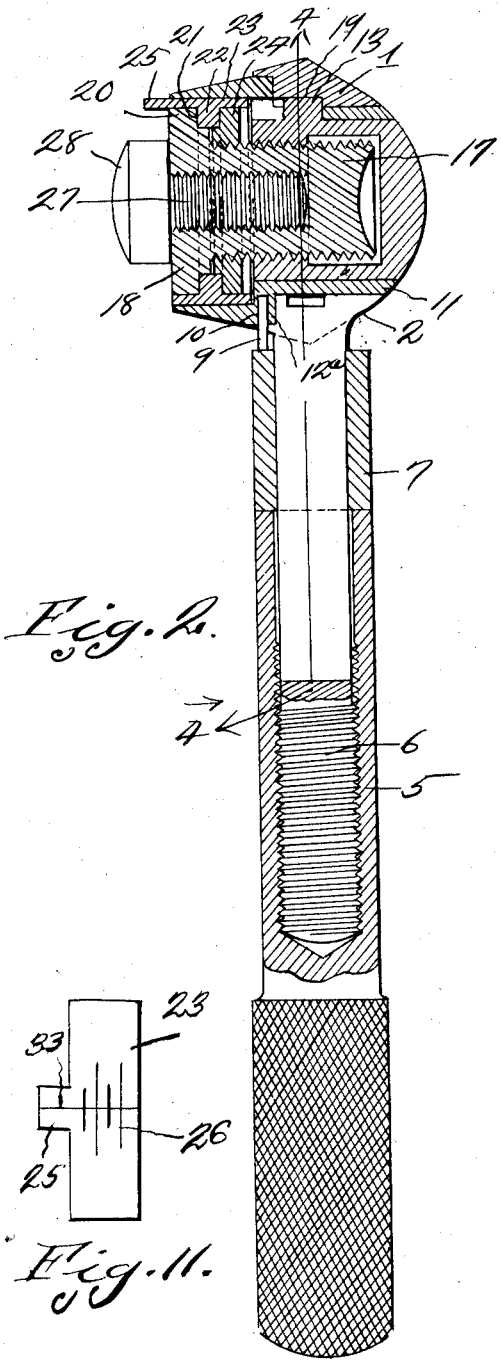
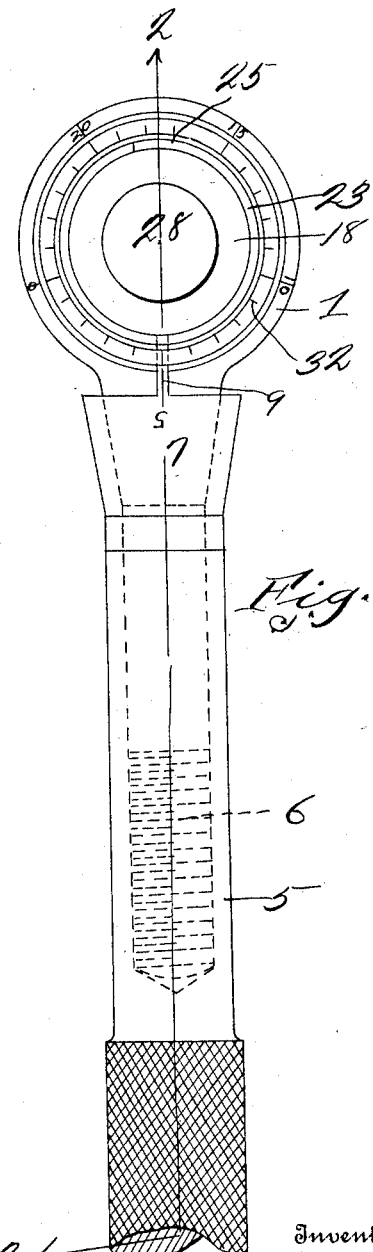
Inventor
Alfred Tangen
By D. Swift
his Attorney

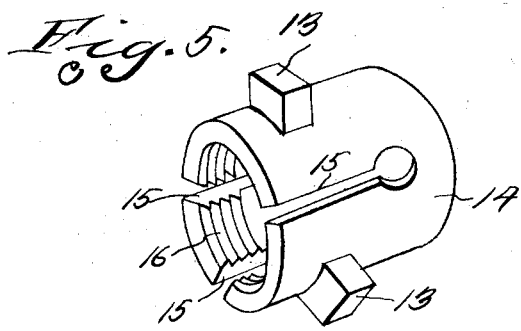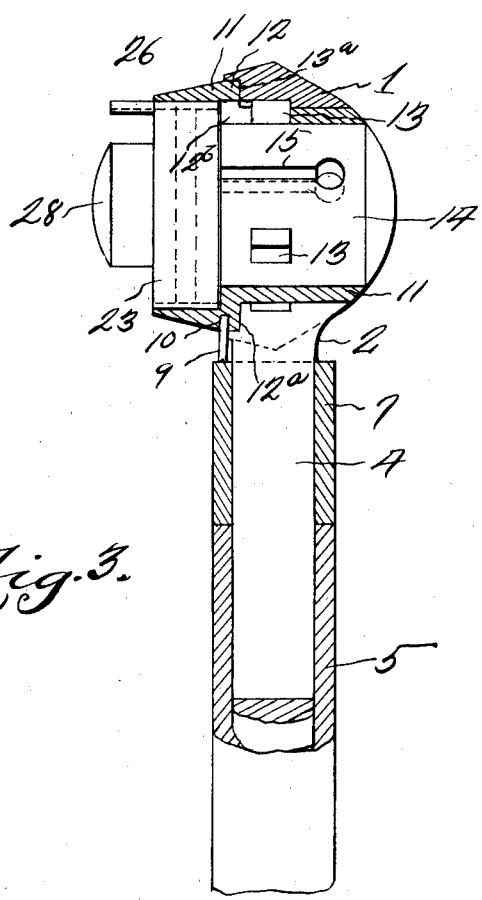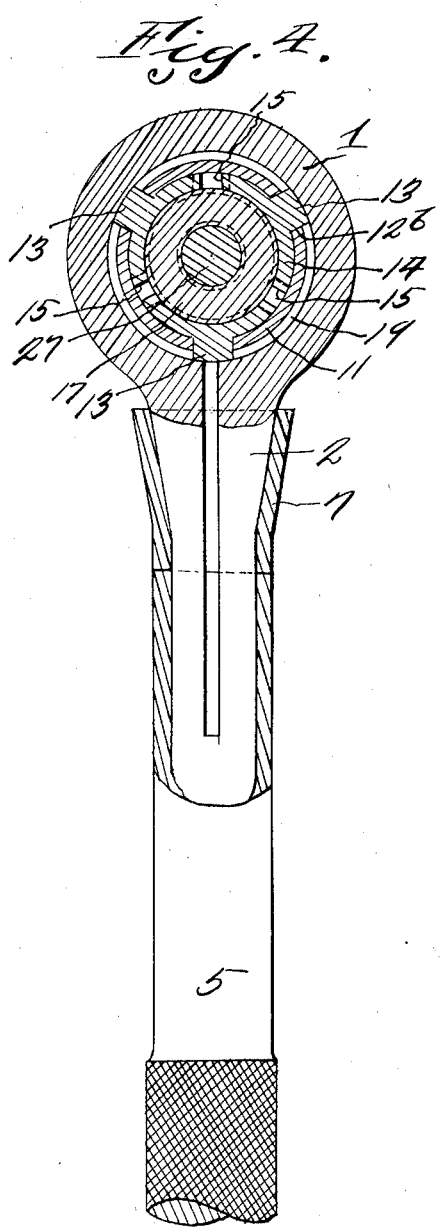

A. TANGEN.
MICROMETER.
APPLICATION FILED SEPT. 8, 1920.
1,385,405.
Patented July 26, 1921.
3 SHEETS—SHEET 3.
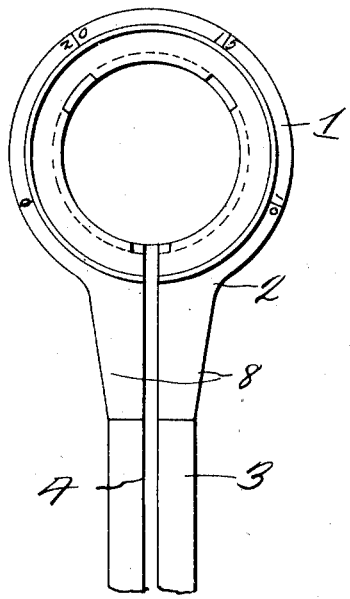
Fig. 6.
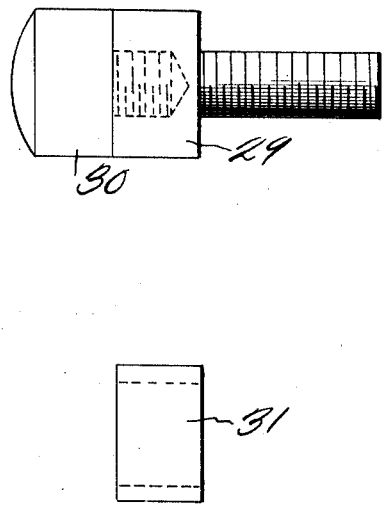
Fig. 9.
Fig. 10.
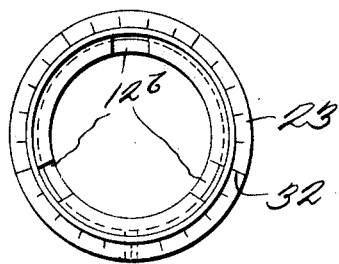
Fig. 8.
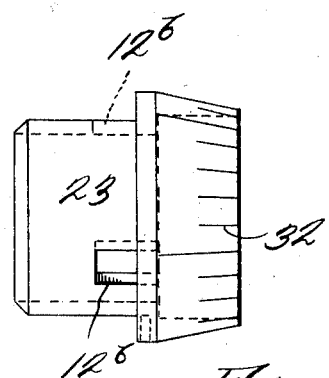
Fig. 7.
Inventor
Alfred Tangen
By D. Swift
 Attorney

UNITED STATES PATENT OFFICE.

ALFRED TANGEN, OF DETROIT, MICHIGAN.

MICROMETER.

1,385,405.  Specification of Letters Patent.  Patented July 26, 1921.

Application filed September 8, 1920. Serial No. 408,988.

*To all whom it may concern:*

Be it known that I, ALFRED TANGEN, a citizen of the United States, residing at Detroit, in the county of Wayne, State of Michigan, have invented a new and useful Micrometer; and I do hereby declare the following to be a full, clear, and exact description of the invention, such as will enable others skilled in the art to which it appertains to make and use the same.

The invention relates to micrometers and has for its object to provide what is known as an inside micrometer which is capable of use for measuring anwhere from one-half to two inches, thereby obviating the common difficulty now experienced with micrometers now constructed and wherein the range of measurement is extremely limited.

A further object is to provide a micrometer comprising a micrometer nut, said nut having split walls and spaced lugs adapted to be received by a graduated sleeve, which sleeve is mounted in a yoke having a split shank, the lugs of the micrometer nut being received by an annular channel in the yoke and to provide the micrometer nut with interior threads in which a micrometer screw is threaded, and adapted to be held against displacement by means operated by the handle which contracts the yoke.

A further object is to provide a micrometer screw with a detachable measuring point, which measuring point may be replaced. Also to provide a graduated adjustable collar carried by the micrometer screw and held thereon by a lock nut, said graduated adjustable collar being provided with an indicator member adapted to coöperate with a scale carried by the graduated sleeve.

A further object is to provide a micrometer yoke having a split handle provided with a tapered portion, on which tapered portion a tapered sleeve is mounted and moved in the jamming position with the tapered portion of the handle for contracting the yoke, said sleeve being provided with a finger adapted to engage an aperture in a graduated sleeve for preventing displacement of said graduated sleeve.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a front elevation of the micrometer.

Fig. 2 is a longitudinal sectional view through the micrometer taken on line 2—2 of Fig. 1.

Fig. 3 is a sectional view through the micrometer head, showing the graduated sleeve and micrometer nut clamp in section.

Fig. 4 is a sectional view through the micrometer and clamp taken on line 4—4 of Fig. 2.

Fig. 5 is a perspective view of the micrometer nut.

Fig. 6 is a plan view of the micrometer clamp.

Fig. 7 is a side elevation of the graduated sleeve.

Fig. 8 is a view looking into the graduated sleeve.

Fig. 9 is a side elevation of the threaded measuring point showing the same threaded in an extension member.

Fig. 10 is a side elevation of an extension collar which may be used in connection with the threaded measuring point.

Referring to the drawing the numeral 1 designates the annular clamping head of the micrometer clamp 2, the shank 3 of which is split as at 4 so that the same may be contracted and the handle member 5 which is threaded on the lower end 6 is forced into engagement with the slidable sleeve 7 on the tapered portion 8 of the shank 3. When the slidable sleeve 7 is forced in the direction of the clamp head 1, it will be seen that the annular clamping head will be forced together. Sleeve 7 is provided with a lug 9 which enters an aperture 10 in a graduated sleeve 11 which is disposed in the clamping head 1 and is clamped against movement therein. Graduated sleeve 11 is provided with a shoulder 12ª which is received by a counterbore 13 in the clamping head 1. Sleeve 11 is provided with radial notches 12 which receive the radial lugs 13 of the micrometer nut 14, said micrometer nut being split as at 15 so that its interior thread 16 in which is threaded the threaded shank 17 of the micrometer screw 18 may be bound and held when the clamping head 1 is contracted, thereby preventing displacement of the micrometer nut and the micrometer screw in relation to each other after a measurement has been taken and the clamping head 1 contracted. The lugs 13 of the micrometer nut pass through the wall of the graduated sleeve and are disposed in the annular channel 19 of the clamping head 1 so that the threaded end of the micrometer nut may be forced into locking engagement with the threaded shank 13 of the micrometer screw thereby locking the micrometer screw and micrometer nut against movement in relation to each other after a measurement has been taken.

The outer end of the micrometer screw 18 is provided with a flange 20, the under face of which is provided with annular channel 21 for the reception of an annular flange 22 of a graduated adjustable collar 23, there being a lock nut 24 threaded on the threaded shank 17 of the micrometer screw and forming means whereby when it is forced into engagement with the annular flange 22, the graduated adjustable collar may be held in any circumferential adjusted position. The outer edge of the graduated adjustable collar is provided with an outwardly extending lug 25 which may be engaged by the finger for rotating the collar 23 and the micrometer screw 18. The outer periphery of the graduated adjustable collar 23 is provided with a transversely disposed scale 26 which is uncovered in relation to the graduated sleeve as the collar 23 and the micrometer screw 18 are moved outwardly. Threaded into the micrometer screw 18 is a threaded shank 27 of the measuring point 28 and may be replaced by a larger point for measurements of greater size, or if so desired may be replaced by an extension as shown in Fig. 9, in which figure the measuring point 29 may, for instance, be an eighth of an inch thick and the extension 30 another eighth thick, thereby one quarter of an inch to the measurement being taken and the fractions being taken care of through the scales of the micrometer proper. If so desired, instead of extension members as shown in Fig. 9, collars 31 as shown in Fig. 10 may be interposed between the measuring point 28 and the outer face of the micrometer screw thereby adding greater range of measuring to the micrometer. The graduated sleeve 11 is provided with graduations 32 which are read in connection with the vertical line 33 of the graduated adjustable collar 23.

From the above it will be seen that a micrometer of the inside micrometer type is provided which is compact in form and so constructed that it will be possible to take small measurements, for instance, up to a desired size and also so constructed that measurements above one inch may be taken with the same micrometer. The great difficulty with micrometers at present constructed is that they are limited in range of measurement, for instance it is necessary to have two inside micrometers to take measurements up to two inches, one micrometer being up to one inch and the other up to two inches.

The invention having been set forth what is claimed as new and useful is:—

1. A micrometer comprising a micrometer screw and a micrometer nut in which said screw is threaded, the walls of the micrometer nut being split, lugs carried by said micrometer nut, said lugs being disposed in slots of an adjustable graduated collar, said lugs extending beyond the outer walls of the adjusted graduated collar and disposed in an annular channel of a contractible micrometer clamp, said contractible micrometer clamp forming means whereby when the clamp is contracted the threads of the micrometer screw and the micrometer nut will be bound and locked together, and means for contracting the contractible micrometer clamp.

2. A micrometer comprising a micrometer screw and a micrometer nut in which said screw is threaded, said micrometer nut being provided with radially disposed lugs and slots in its wall, a sleeve surrounding the micrometer nut and provided with apertures through which the micrometer nut extends and projects, a contractible annular micrometer clamp in which the sleeve is disposed, said clamp terminating in a split handle having a tapered portion, the lugs of the sleeve being disposed in an annular channel of the contractible clamp, a tapered sleeve disposed on the tapered portion of the split handle and a member threaded on the handle for forcing the tapered sleeve onto the tapered handle for contracting the contractible clamp and binding the thread of the micrometer nut and the micrometer screw.

3. A micrometer comprising a micrometer screw and a micrometer nut in which said screw is threaded, said micrometer nut being provided with radially disposed lugs and slots in its wall, a graduated adjustable sleeve surrounding the micrometer nut and provided with apertures through which the micrometer nut lugs extend and project, a contractible annular micrometer clamp surrounding the graduated sleeve, said clamp terminating in a split handle having a tapered portion adjacent the split, the lugs of the graduated sleeve being disposed in an annular channel of the contractible clamp, a tapered sleeve disposed on the tapered portion of the split handle, a member threaded on the handle for forcing the tapered sleeve onto the tapered handle for contracting the contractible clamp and binding the thread of the micrometer nut and the micrometer screw, a lug carried by the tapered sleeve for engagement with an aperture in the graduated adjustable sleeve for holding said sleeve against circumferential movement, a second graduated adjustable sleeve having an annular flange engaging a flange of the micrometer screw, a lock nut threaded on the shank of the second adjustable sleeve and means whereby the measuring point of the micrometer screw may be extended.

In testimony whereof I have signed my name to this specification in the presence of two subscribing witnesses.

ALFRED TANGEN.

Witnesses:
OLLE H. ROLLAG,
JOHN H. BERGSTROM.